United States Patent [19]

Heitland et al.

[11] 4,143,644
[45] Mar. 13, 1979

[54] APPARATUS FOR PRODUCING USEFUL HEAT FROM SOLAR RADIATION

[75] Inventors: Herbert Heitland; Rudolf Kroll; Edgard Grundmann, all of Wolfsburg, Fed. Rep. of Germany

[73] Assignee: Volkswagenwerk Aktiengesellschaft, Wolfsburg, Fed. Rep. of Germany

[21] Appl. No.: 802,961

[22] Filed: Jun. 2, 1977

[30] Foreign Application Priority Data

Jun. 11, 1977 [DE] Fed. Rep. of Germany ....... 2626182

[51] Int. Cl.$^2$ ............................................. F24J 3/02
[52] U.S. Cl. ...................................... 126/271; 126/270
[58] Field of Search ................ 126/270, 271; 237/1 A

[56] References Cited

U.S. PATENT DOCUMENTS

| | | | |
|---|---|---|---|
| 3,513,828 | 5/1970 | Masters | 126/271 |
| 3,991,742 | 11/1976 | Gerber | 126/271 |
| 4,024,853 | 5/1977 | Gordon | 126/271 |
| 4,079,726 | 3/1978 | Voelker | 126/271 |

*Primary Examiner*—Kenneth W. Sprague
*Attorney, Agent, or Firm*—Spencer & Kaye

[57] ABSTRACT

Apparatus for producing useful heat from solar radiation and which in the operating position is oriented in an inclined plane. The apparatus includes a coilable conduit structure which is provided with an inlet and an outlet for a flowable heat carrier medium and is formed of two elongated flexible foils, with one being colored so as to absorb solar radiation, which are sealingly connected together along their edge regions and are sealingly connected together along lines in their center regions to form a plurality of parallel flow channels which extend along the longitudinal axis of the foils, and first and second transverse flow channels which connect the respective adjacent ends of said parallel flow channels together. The first transverse flow channel, which in the operating position of the apparatus is the upper transverse flow channel, is connected with an upper region of a reservoir for the flowable heat carrier medium while the second transverse flow channel, which in the operating position is the lower transverse flow channel, is connected with a lower region of the reservoir.

12 Claims, 6 Drawing Figures

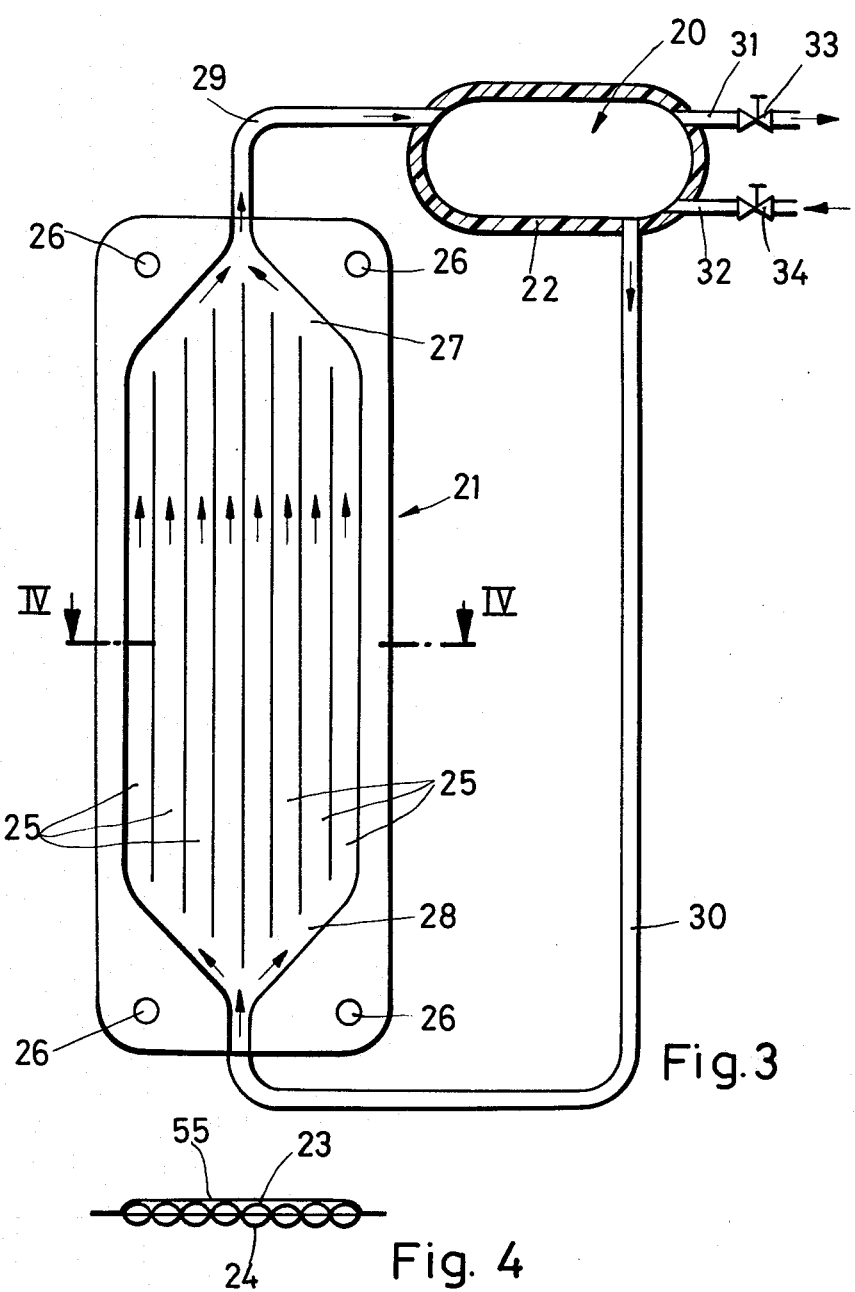

APPARATUS FOR PRODUCING USEFUL HEAT FROM SOLAR RADIATION

BACKGROUND OF THE INVENTION

The present invention relates to an improved solar fluid heating apparatus. More particularly, the present invention relates to an easily transportable solar fluid heating apparatus wherein circulation of the flowable heat carrier medium to and from a reservoir is achieved, without the requirement of an additional pump, by changes in the density of the heated fluid medium.

French Patent No. 1,097,233, published July 1, 1955, and Swiss Patent No. 246,216, published Sept. 1, 1947, disclose that it is known generally, in rigid structures made of sheet metal, to utilize the differences in density of a medium produced by heating to provide movement of the medium in order to produce useful heat from solar radiation. According to the French patent, two profiled sheet metal plates are combined in such a manner that they form parallel flow channels in the control region of the device, and a transverse channel is disposed below and above these channels with the transverse channels being in communication with an inlet or outlet, respectively. The interconnection of this rigid conduit structure with a reservoir for the medium in such a manner that a circulation of the medium is effected through the conduit structure as well as through the reservoir is not disclosed in this patent.

The above mentioned Swiss patent discloses a rigid reservoir disposed above the conduit structure formed of sheet metal plates which are arranged at slight mutual distances. The conduit structure is in communication with the reservoir through a gap. In this device, the entire quantity of fluid in the reservoir is to be heated by means of convection. Even if the described small space between the sheet metal plates is complemented to form parallel channels, no controlled circulation of the medium results in this known structure because the medium which is heated in the conduit structure rises in all channels, i.e., over the entire cross section of the conduit structure and the still cold medium from the reservoir drops in all channels as well.

In addition to the above mentioned disadvantages and deficiencies of the above-described prior art, these rigid prior art devices suffer from the further disadvantages that they are not easily transportable and generally require some special form of fastening device such as a foundation or the like.

A type of solar fluid heating device which has an advantageous structure in that it is easily transportable and does not require any special or permanent type of fastening structure is disclosed in U.S. Pat. No. 3,022,781, issued Feb. 27, 1962 to S. Andrassy and in applicants' copending U.S. patent application Ser. No. 675,594, filed Apr. 9, 1976. The conduit structures disclosed therein are generally in the form of a coilable mat formed by selective connections between two flexible foils, e.g., of plastic, with at least one of the foils being colored so as to absorb solar radiation. In these conduit structures, it is intended to provide flow channels which are as long as possible. For this reason the connections between the various foils, which are formed, for example, by welding, are preferably arranged so that meander or serpentine shaped flow channels extend between the inlet and outlet for the heat carrier medium, which generally is water.

Finally, to round out the state of the art, reference is made to German Gebrauchsmuster (Utility Model) No. 75 24 272 which describes a water tank made of a rubber-like material that can serve, for example, as a shower. This bag-like tank is supposed to be hung in the sun so that its contents are heated by the sun's rays. In this reference, there is no teaching of the important subdivision into a flat conduit structure to heat the medium or of a reservoir for the medium.

SUMMARY OF THE INVENTION

It is the object of the present invention to provide a portable solar fluid heating device which is relatively inexpensive, is generally applicable as such a device and can also be used to provide a reservoir of a large volume of the heated heat carrier medium, i.e., generally water.

The above object is achieved by means of an apparatus which, in the operating position is oriented in an inclined plane and comprises a coilable conduit structure provided with an inlet and an outlet for a flowable heat carrier medium; with the conduit structure being formed of two elongated flexible foils, one of which is colored so as to absorb solar radiation, which are sealingly connected together along their edge regions and are sealingly connected together along lines in their center regions to form a plurality of parallel flow channels which extend in the longitudinal direction of the foils and first and second transverse flow channels which connect the respective adjacent ends of the parallel flow channels together; a reservoir for the flowable heat carrier medium; means for connecting the first transverse flow channel, which in the operating position of the apparatus is the upper transverse flow channel, with an upper region of the reservoir; and means for connecting the second transverse flow channel, which in the operating position is the lower transverse flow channel, with the lower region of the reservoir.

The design of the device or apparatus as provided by the present invention makes it possible to assure circulation of the heat carrier medium in the device itself, which includes a conduit structure and a reservoir, and without the use of an additional pump, merely by the changes in density of the heat carrier medium produced by solar radiation heating. When the apparatus is installed, the heat carrier medium flows through the parallel flow channels which then extend from the bottom to the top in a more or less inclined manner and reaches the reservoir disposed thereabove merely by being heated. In the reservoir a formation of layers begins in that the cooler heat carrier medium collects in the lower region of the reservoir while the warmer heat carrier medium collects in the upper region. The cooler heat carrier medium can then drop out of the reservoir again into the lower region of the conduit structure from where it reenters the parallel flow channels through the transverse channel provided there. When the heat carrier medium is then reheated, it again flows upwardly first to the upper region of the reservoir.

The rservoir may be provided as a separate and additional part. However, in the preferred embodiment of the invention, the reservoir is designed to be integral or unitary with the conduit structure, i.e., the reservoir is likewise integrated into the mat-like flexible arrangement and is provided by connections between the two foils.

The apparatus according to the present invention can be used, for example, to heat the water of a swimming pool, in which case a continuously effective circulation for the water may be provided. However, the apparatus according to the present invention can also be employed to provide heated water for use, for example, for the showers on camp grounds.

BRIEF DESCRIPTION OF THE DRAWINGS

FIG. 3 is a schematic plan view of a further embodiment of the invention.

FIG. 4 is a schematic cross-sectional view along the line IV—IV of FIG. 3.

DETAILED DESCRIPTION OF THE PREFERRED EMBODIMENT

Figures 1, 2:
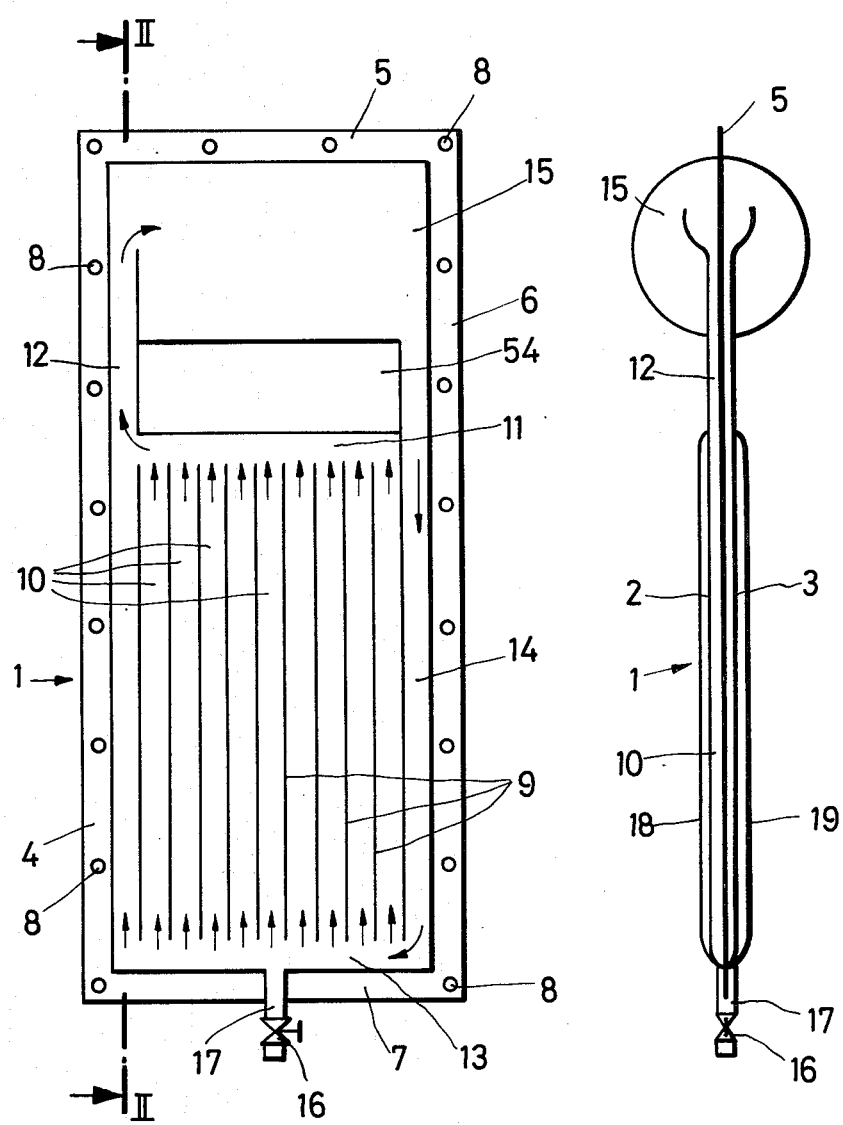
FIG. 1 is a schematic plan view of one embodiment of the apparatus according to the invention.
FIG. 2 is a schematic longitudinal sectional view along the line II—II of FIG. 1.

Referring first to the embodiment of FIGS. 1 and 2, which probably shows the simplest embodiment of the invention, there is shown a conduit structure 1 which is formed by two plastic foils or sheets which are connected together by welded lines in order to produce a certain flow path. Foil 2 is given a dark color in order to absorb the solar radiation, while foil 3 may be either transparent or dark, as desired. These foils 2 and 3, as can be seen in particular in FIG. 1, are closely and sealingly welded together at their longitudinal and transverse edge regions 5 through 7, where they are also provided with holes 8 for hanging the structure, for example, on an oblique house roof, and are also sealingly welded together along a plurality of straight lines 9 in their center regions so that a plurality of parallel flow channels 10 are produced which, when the device is installed extend from the bottom to the top, i.e., in the longitudinal direction. Each of the flow channels 10 is associated with a common transverse channel 11 at one end and a common transverse flow channel 13 at the other end which are likewise formed between the foils 2 and 3 by connections thereof. The transverse channel 11, which is the upper transverse flow channel when the conduit structure is in the operating position, is in communication via a connecting channel 12 with the upper region of a reservoir 15 for the heat carrier medium, here water, while the other transverse channel 13 is in communication via connecting channel 14 with the lower region of the reservoir 15. As shown, the connecting channels 12 and 13 are disposed on opposite sides of the conduit structure and extend parallel to the flow channels 10. With this arrangement no additional pumps or the like are required to produce a flow of the heat carrier medium in the flow channels 10 as indicated by the arrows. Rather this flow is a result simply of heating of the heat carrier medium by the solar radiation.

In this simple embodiment a connecting pipe 17, including a valve 16, which opens into the lower transverse channel 13 is provided in order to fill the conduit structure with the heat carrier medium, here water, as well as for the removal of the warm or heated heat carrier medium.

FIG. 1 is thus a top view of the side of the device facing the sun. For better insulation it may be advisable to cover the above-described arrangement, at least in the region of the flow channels 10, with transparent foils 18 and 19, which can be seen only in FIG. 2, to provide a cushion of air between the foils 18 and 19 and the respective adjacent foils 2 and 3.

While the above-described embodiment has the advantage of being made of one piece, it has the drawback that only one pipe 17 is provided so that removal and replenishment of heat carrier medium, e.g., water, can only be done alternately. FIG. 3 shows an embodiment of the invention in which the means for removing and replenishing the heat carrier medium from the apparatus are separate and the reservoir, which is here given the reference numeral 20, is disposed outside of and separated from the actual conduit structure 21. Advisably, however, the reservoir 20 is also made of a flexible material such as plastic and provided with an insulating wall 22.

The actual conduit structure 21 is again made, as can be seen particularly in the sectional view of FIG. 4 along the line IV—IV, of a colored, solar radiation absorbing flexible foil 23 and in this case a transparent upper foil 24. The two foils 23 and 24 are again connected together by linear welding along their edges as well as in their center region so that parallel flow channels 25 are formed. The edge regions are here likewise provided with means for fastening the conduit structure 21, i.e., again with holes 26. Here again two transverse flow channels 27 and 28, which however are no longer linear, are disposed near the upper and lower ends, respectively, of the conduit structure 21. The upper transverse channel is in comunication, via connecting line 29, with the upper region of reservoir 20 while the lower transverse channel 28 is in communication, via connecting line 30, with the lower region of reservoir 20. Each of the upper and lower regions of reservoir 20 is provided with a respective short pipe 31 or 32 and the associated valves or spiggots 33 or 34, respectively. The upper pipe 31 with valve 33 serves to remove the warm water from the apparatus while the lower pipe 32 with valve 34 serves to add water to the apparatus. The replenished water thus flows through connecting line 30 into the lower transverse channel 28 of the conduit structure 21, flows in the direction of the arrows through the plurality of parallel flow channels 25, and, via transverse channel 27 and line 29, reaches the upper region of reservoir 20 in a heated state from where it can be discharged through pipe 31. Here, again the appropriate arrangement of the conduit structure 20, i.e., in a way so that the flow channels extend approximately vertically at least in one plane or so that they have a vertical component in their path, automatically produces the described circulation. The numeral 55 in FIG. 4 indicates a heat insulating foil similar to the foils 18 and 19 of FIG. 2.

Figure 5:
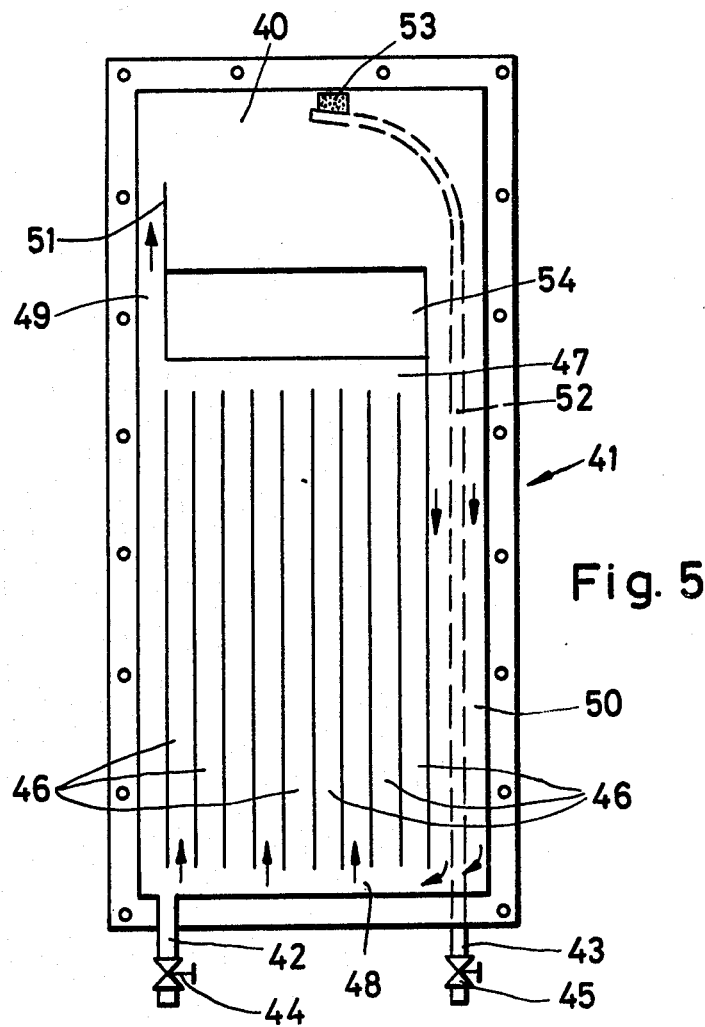
FIG. 5 is a schematic plan view of still another embodiment of the invention which is a modification of the embodiment of FIG. 1.

The embodiment of FIG. 5 now combines the advantages of the structures of FIGS. 1 and 2 as well as FIGS. 3 and 4, i.e., it is a device in which the reservoir, here marked 40, is integrated into the conduit structure 41 and in which separate pipes 42 and 43 with valves or the like 44 and 45, respectively for filling the conduit structure and the reservoir on the one hand and for the discharge of heated liquid, on the other hand, are provided. As in the embodiment of FIGS. 1 and 2, two plastic foils are again welded together so as to form a plurality of parallel flow channels 46 which when the conduit structure is installed are preferably arranged so as to be vertical or have a vertical component, transverse channels 47 and 48, as well as connecting channels 49 and 50 for connecting the respective associated transverse channels 47 and 48 with the upper and lower regions, respectively, of the reservoir 40. The two regions of the reservoir are defined structurally, as in the embodiment according to FIGS. 1 and 2, by the linear connection between the two foils at 51.

In this embodiment a hose 52 is inserted between the two foils which enclose the various flow channels 46–50 and the reservoir 40. One end of the hose 52 opens into a discharge pipe 43 which is provided with a valve 45. The upper end of hose 52 in FIG. 5, i.e., the end inside the reservoir, is connected to a float 53 and is otherwise mounted to be freely movable so that the portion of the medium in reservoir 40 which has the highest temperature can always be removed through this hose 52. Preferably, as shown, the short discharge 43 connected to the hose 52 is disposed at the same transverse edge of the conduit structure as is the short fill pipe 42 with its valve 44. Additionaloy, as shown the short fill pipe 42 preferably opens into the transverse channel 48 adjacent the end thereof opposite the end which is in communication with the connecting channel 50.

While the embodiment according to FIG. 5 is particularly suitable if a water line is available from which to fill it, such a water line is not always available. According to the modification shown in FIG. 6 the upper region of the again integrated reservoir 61 is provided with a funnel-shaped fill opening 60 which is suitable for replenishment by means of a can or the like. Here again, a hose 63 which is provided with a flow 62 at its upper end is provided for the discharge of the heated heat carrier medium in the reservoir. Otherwise the structure of FIG. 6 is the same as that of FIG. 5.

Figure 6:
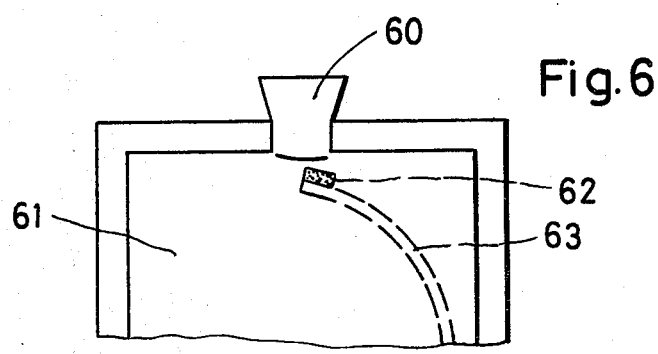
FIG. 6 shows a portion of the embodiment of FIG. 5 and illustrates a modification of same.

Compared to the embodiment of FIGS. 1 and 2, the structures according to FIGS. 5 and 6 have the advantage that the discharge of the medium takes place at the highest point in the reservoir, i.e., it is always the medium with the highest temperature that is removed. In the structure according to FIGS. 1 and 2, since the discharge takes place at the lowermost point, the entire heat carrier medium content of the conduit structure including the reservoir must first be heated before any heated water can be obtained.

The embodiments according to FIGS. 1 and 5 have a cutout section 54 which during filling of the conduit structure permits transverse contraction of the same in which the reservoir participates only to a slight degree.

It will be understood that the above description of the present invention is susceptible to various modifications changes and adaptations, and the same are intended to be comprehended within the meaning and range of equivalents of the appended claims.

What is claimed is:

1. Apparatus for producing useful heat from solar radiation and which in the operating position is oriented in an inclined plane comprising: a coilable conduit structure provided with an inlet and an outlet for a flowable heat carrier medium, said conduit structure being formed of two elongated flexible foils, of which at least one is colored so as to absorb solar radiation, which are sealingly connected together along their edge regions and are sealingly connected together along lines in their center regions to form a plurality of parallel flow channels which extend in the longitudinal direction of said foils and first and second transverse flow channels which connect the respective adjacent ends of said parallel flow channels together; a reservoir for the flowable heat carrier medium; first means for connecting said first transverse flow channel, which in the operating position of the apparatus is the upper transverse flow channel, with an upper region of said reservoir; second means for connecting said second transverse flow channel, which in the operating position is the lower transverse flow channel, with a lower region of said reservoir; and a hose for the removal of the heated heat carried medium, said hose extending into said reservoir with the end of said hose which is disposed inside said reservoir being freely movable and provided with a float.

2. Apparatus as defined in claim 1 further comprising means, including a short pipe which opens into said second transverse flow channel, for introducing the flowable heat carrier medium into said conduit structure; wherein said short pipe passes through one of the transverse edges of said conduit structure; and wherein said hose is brought to said one transverse edge of said conduit structure.

3. Apparatus as defined in claim 2 wherein said second means is connected to one end of said second transverse flow channel, and said short pipe opens into said second transverse flow channel in the vicinity of the end thereof opposite that connected to said second means.

4. Apparatus as defined in claim 1 further comprising a short pipe opening into said reservoir for feeding the heat carrier medium into said reservoir.

5. Apparatus as defined in claim 1 further comprising means, provided on at least some of the edge regions of said conduit structure, for suspending said conduit structure so that said plurality of parallel flow channels extend at least approximately vertically in at least one plane.

6. Apparatus as defined in claim 1 wherein said reservoir is disposed above said conduit structure when said apparatus is in said operating position.

7. Apparatus as defined in claim 6 wherein said reservoir and said conduit structure form a unitary structure.

8. Apparatus as defined in claim 7 wherein said reservoir is formed by sealing connections between said two foils and is disposed on the side of said first transverse flow channel opposite that connected to said plurality of flow channels; and said first and second means comprise first and second connecting flow channels which are formed by further sealing connections between said two foils and which are disposed on opposite sides of said conduit structure parallel to said plurality of parallel flow channels.

9. Apparatus as defined in claim 8 further comprising means, including a short pipe which opens into said second transverse flow channel, for introducing the flowable heat carrier medium into said conduit structure.

10. Apparatus as defined in claim 9 wherein said short pipe opens into said second transverse flow channel in the vicinity of the end thereof opposite that connected to said second connecting flow channel.

11. Apparatus as defined in claim 2 wherein: said reservoir and conduit structure form a unitary structure with said reservoir being disposed above said conduit structure when said apparatus is in said operating position; said reservoir is formed by sealing connections between said two foils and is disposed on the side of said first transverse flow channel opposite that connected to said plurality of flow channels; said first and second means comprise first and second connecting flow channels which are formed by further sealing connections between said two foils and which are disposed on opposite sides of said conduit structure parallel to said plurality of parallel flow channels; and said hose is brought to said one transverse edge via said second connecting flow channel.

12. Apparatus as defined in claim 11 wherein said short pipe opens into said second transverse flow channel in the vicinity of the end thereof opposite that connected to said second connecting flow channel.

* * * * *